Sept. 28, 1943. J. KANTOR ET AL 2,330,430
LABEL AFFIXER
Filed July 22, 1941 9 Sheets-Sheet 1

Fig. 1.

INVENTOR.
James Kantor and
Edward Rosenberg,
BY Hood & Hahn.
ATTORNEYS.

Sept. 28, 1943. J. KANTOR ET AL 2,330,430
LABEL AFFIXER
Filed July 22, 1941 9 Sheets-Sheet 5

INVENTOR.
James Kantor and
Edward Rosenberg.
BY
Hood & Hahn
ATTORNEYS

Sept. 28, 1943.  J. KANTOR ET AL  2,330,430
LABEL AFFIXER
Filed July 22, 1941  9 Sheets-Sheet 9

INVENTOR.
JAMES KANTOR AND,
BY EDWARD ROSENBERG
Hood & Hahn
ATTORNEYS

Patented Sept. 28, 1943

2,330,430

UNITED STATES PATENT OFFICE 2,330,430

LABEL AFFIXER

James Kantor and Edward Rosenberg, Chicago, Ill., assignors to The Liquid Carbonic Corporation, Chicago, Ill., a corporation of Delaware Application July 22, 1941, Serial No. 403,560

24 Claims. (Cl. 216—13)

The present invention relates to improvements in apparatus for applying labels to bottles and similar containers.

One of the objects of the invention is to provide a container labeling apparatus capable of extremely high speed operation, which will apply a label or labels to a container, in gummed condition, and press said label or labels around the cylindrical container so that the labels will firmly adhere to the container and, at the same time, will be placed thereon in a smooth and unwrinkled condition.

Another object of our invention is to provide an improved feeding mechanism for labeling machines of the type above referred to. In labeling machines of the above-referred to type, it is important that the containers be delivered to the labeling mechanism in accurately spaced relation. As the result of this accurate spaced relationship, which is maintained throughout the period of applying the label, when the containers move off of the label-applying machine, they are relatively widely spaced apart and due to the fact that the delivery mechanism is operating at comparatively high speed, there is a decided tendency for the containers to tilt and become displaced. It is one of the objects of our present invention to provide a feeding and removing mechanism which will accurately space the containers during the infeed thereof, will immediately, after the outfeed thereof, cause the bottles to be bunched practically into contact with one another and thereby prevent the tendency for the containers or bottles to be tilted.

Another object of our invention is to provide an improved means of handling the label as it is removed from the labeling magazine and delivered to the container.

A still further object of our invention is to provide an improved means for holding the label or labels applied to the container during the process of "ironing" the label on the container.

Other objects and advantages of the apparatus will appear more fully hereinafter in the appended specification and claims.

In the accompanying drawings illustrating an embodiment of our invention.

Figure 1:
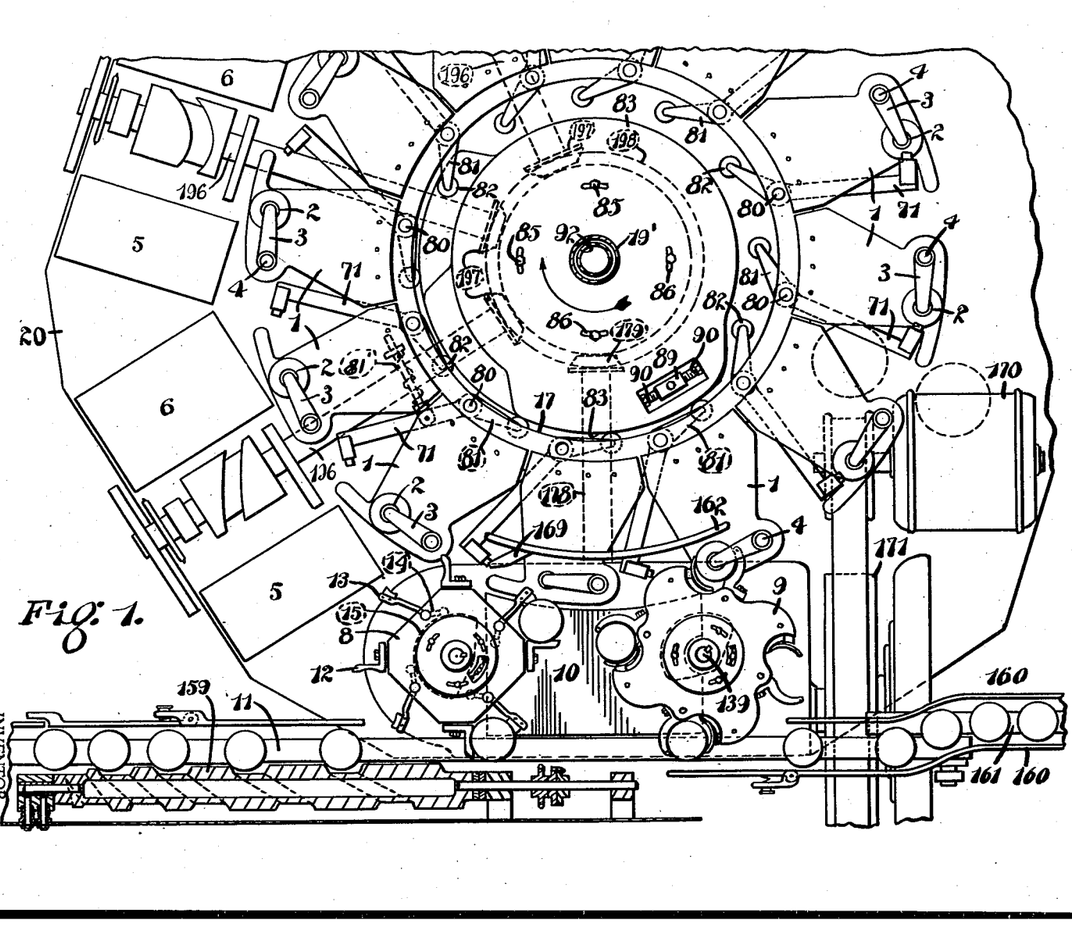
Fig. 1 is a partial plan view, partly in section and partly diagrammatic, of the rotating container supporting table and associated parts.
Figure 2:
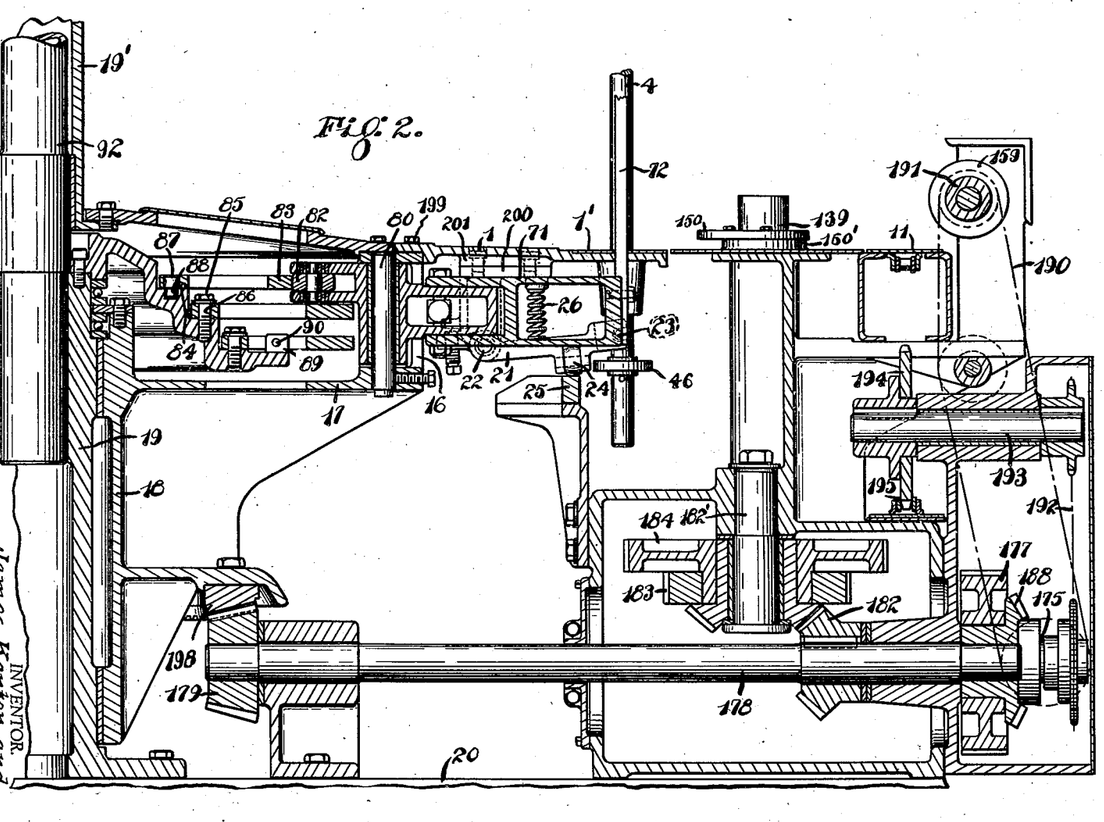
Fig. 2 is a longitudinal sectional view showing the drive mechanism, the container supporting table, and the means for operating the container grippers.

In the apparatus illustrated, we provide a rotary table, or support, carrying a plurality of container-supporting arms 1. Each of these arms is adapted to receive a container, hereinafter, for convenience, referred to as a bottle, which is gripped at its top by a suitable gripper cup 2 carried on the gripper arm 3 mounted at the top end of a gripper rod 4. As the bottle-receiving table rotates in a clockwise direction, the bottles pass a plurality of label-applying stations. Each of these stations is provided with a picker at 5 and a label magazine and glue pot 6. The pickers and the label magazines of each station are of substantially the same construction and description of one, as hereinafter given, will be sufficient for all. Each of the supporting arms 1 has, on its upper surface, a removable hardened steel wear plate 1' (Fig. 2). The containers being slid on and off the support tend to wear this part of the support and in order to take care of this wear, we provide the wear plates which are removable.

After having passed the picker and labeling magazine stations and having had applied thereto one or more labels, the bottles pass to a series of ironers 7 (Fig. 3), one arranged without the circumference of the path of the bottle and the other within the circumference of said path.

For delivering the bottles to the grippers 2, we provide an infeed star 8 and for removing the bottles after the labels have been applied thereto, we provide an outfeed star gripper 9. These stars 8 and 9 operate above a stationary table 10 arranged adjacent the rotary table and operating adjacent the stars and table is a conveyor belt 11 which conveys the bottles to the infeed star and from the outfeed star. Each sector of the infeed star is provided with a relatively stationary gripper finger 12 and an oscillating finger 13. The oscillating finger, as the star sector approaches a receiving position, with the fingers 12 and 13 above the conveyor 11, is in its open position, due to the engagement by the arm 14 thereof with the relatively stationary operating cam 15. However, as the relatively stationary finger 12 of the infeed star picks up the bottle from the conveyor 11, the gripper finger 13 will move into gripping engagement and maintain the bottle in this position until it is delivered to a bottle holder on one of the platforms 1. As a bottle is delivered to a platform, the movable gripper 13 again moves to released position to permit the bottle to remain on the platform.

As shown in Fig. 2, each of the tables 1 is mounted on a frame 16 forming a part of a rotary head 17 carried on a sleeve 18 rotatable about a central standard 19 rising from a suitable base 20.

As each bottle is positioned on the table, the gripper cone 2 of said table is caused to descend and engage the top of the bottle, firmly clamping the bottle on the table. To this end, the supporting rod 4 for the gripper arm 3 is automatically raised and lowered through the medium of an oscillating arm 21 pivoted at 22 on the head 17. The free end of this arm 21 is bifurcated to engage a roller 23 mounted on the lower end of the rod 4 and, as the roller 24 on the arm 21 rides on and off of a stationary cam 25, the rod 4, and with it the cone gripper 2, will be vertically raised to receiving position and then lowered to clamp on the bottle. To hold the gripper cone 2 in its clamping position, we interpose between the arm 21 and a stationary portion of the frame 17, a coiled spring 26 which biases the free end of the arm downwardly and accordingly biases the supporting rod 4 downwardly.

After the bottle has been gripped in position on a table 1, it passes a picker station 5. There are three of these picker stations and the operation thereof is so timed that initially the first station will apply a label to the first bottle passing the same. The second station will apply a label to the second bottle passing the same, and the third station will apply a label to the third bottle passing the same so that after the initial start of the machine, each applying means operates on every third bottle. This arrangement permits of the speedy application of labels, while allowing a sufficient interval of time between the operation of each label picker for it to receive a gummed label and move in position to apply the label or labels to the bottle.

At each picker station, we provide a label magazine 27 adapted to receive and hold a stack or a plurality of stacks, one above the other, of the labels to be applied to the bottle. The magazine illustrated is adapted to support two stacks of labels, one at 28 for the bottle neck and one at 29 for the body of the bottle. These labels are stacked in the magazine with their engaging, or inner surfaces, facing the label picker, and the labels are maintained in the magazine by suitable spring fingers which, while preventing the labels from sliding out, permit the ready removal of the bottom-most label from the stack by the pickers.

Figures 5, 6:
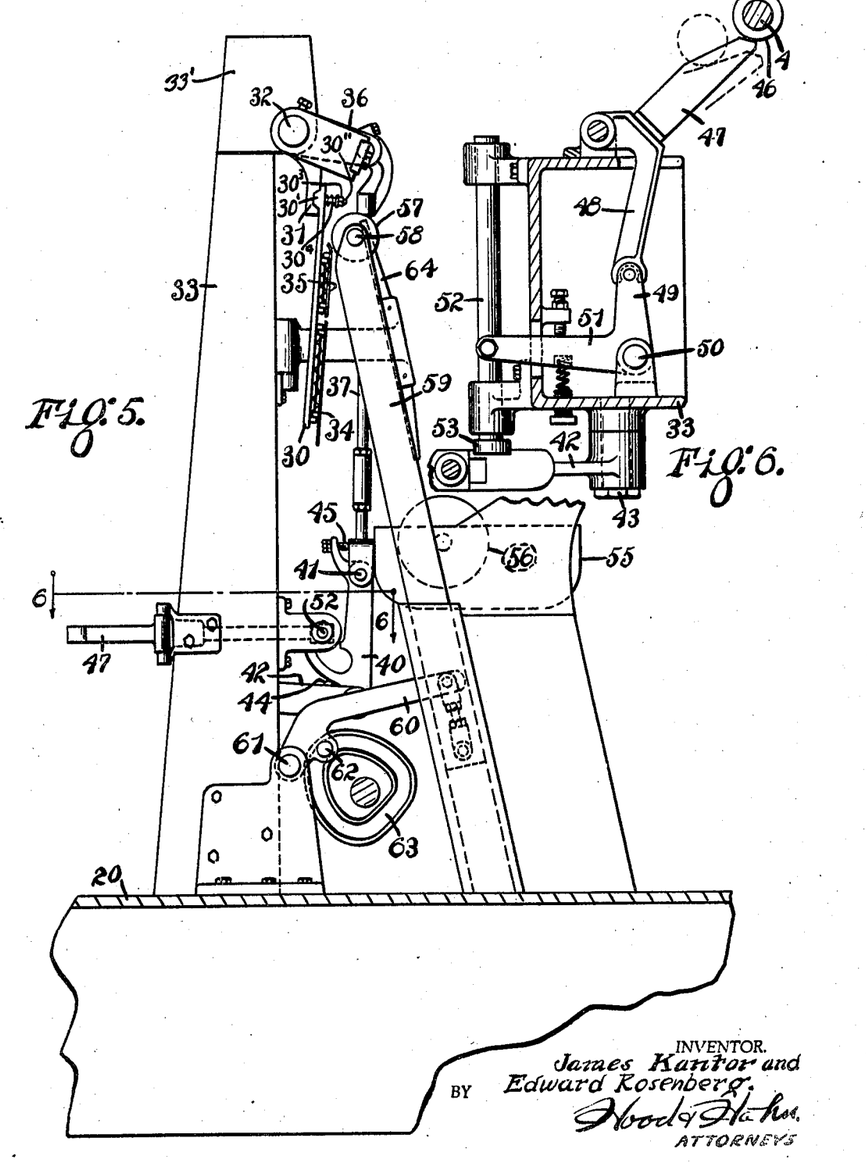
Fig. 5 is an elevation, looking in a direction opposite that of Fig. 4 and showing the glue applying means.
Fig. 6 is a sectional view on the line 6—6 of Fig. 5.

Each of the label pickers is mounted to oscillate toward and away from the magazine 27 and immediately prior to its oscillating movement toward the magazine to receive on the face thereof a thin film of glue. This film of glue is sufficient to cause a label from the magazine to adhere to the picker as the picker is moved into contact with the label and then moved away from the label magazine. Each picker comprises, referring to Fig. 7, a pair of downwardly extending spaced apart arms 30 extending from a head 31 laterally slidable upon a shaft 32 carried from a suitable supporting riser 33 (Fig. 5) forming a part of the main frame. This riser is formed in two sections, 33 and 33'. These label affixers have to be arranged for righthand in some instances, and in other instances, for lefthand feed, and, as a result, these label pickers have to be changed accordingly, although the lower section 33 remains the same. Thus, by making the standards in two sections separate, the head only will have to be made differently. Each of these arms 30 has oscillatingly mounted thereon a pair of lower leaves 34 biased to their closed or label receiving position through suitable springs, and a pair of upper leaves 35 similarly biased. The arms 30 are suitably spaced to permit the passage therebetween of a bottle, and the leaves 34 and 35 will open as the bottle passes between the arms 30, thereby causing the labels supported thereby to come in contact with the bottle during the passage thereof.

These arms 30 are each provided with a tapered tongue 30' (Fig. 5) which fits in a corresponding groove in the arm 31. The arms 30 are resiliently held on the arm 31 by pins 30'' passing through the arms and having interposed between the nuts $30^3$ on the pins and the arms 30 coiled springs $30^4$. By this arrangement, should an unusually wide bottle come in contact with the arms, the arms could give and slightly swing, thereby permitting the passage of the bottle without permanently distorting the arms.

The shaft 32 is oscillated by a crank arm 36 which is connected by a connecting rod 37 with a follower 38 adapted to operate in a cam track 39 of a cam driving member. The follower 38 is mounted at the lower end of an arm 40 pivotally connected at 41 to the bottom of the connecting rod 37 so that, in effect, we provide a jointed connecting rod including the two sections 37 and 40 for connecting the follower 38 with the crank arm 36. The follower 38 is guided by a link 42 having one end thereof pivotally mounted at 43 on the riser 33 and its opposite end connected to the follower 38. This link also carries a spring biased pin 44 which, engaging a face of the arm 40, maintains the two arms 37 and 40 in their straight up and down position biasing the upper end of the arm against a stop 45.

The arms constantly oscillate during the running of the machine and the throw of the arms 30 is normally just sufficient to bring the leaves 34 and 35 into contact with the bottom-most labels of the stacks contained in the magazine 27. If, for any reason, a bottle should not be delivered to a gripper 2, a bottle would not pass through the picker and, as a result, a label would be left in the picker. On the next oscillation, another label would be picked up so that when the bottle did pass therethrough, a plurality of labels would be applied. In order to avoid this difficulty, each reciprocating rod 4 is provided at its lower end with a roller 46 which, as long as a bottle is beneath the gripper 2, will be in a non-engaging position. If, however, no bottle is placed beneath the gripper arm, the rod 4 will drop down until the roller is in a position to strike, as it goes by, an arm or cam trigger 47 of a bell crank lever, the opposite arm 48 of which is connected to one arm 49 of a bell crank lever pivoted at 50. The opposite arm 51 of this bell crank lever is connected to a reciprocating rod 52 having a roller 53 on the end thereof. When the arm 47 is struck by the roller 46, the roller 53 is projected into the path of an arm 54 on the rod section 40. Therefore, when the rod section 40 is rocked, breaking the joint between sections 37 and 40, thereby shortening the throw of the connection between the follower 38 and the crank arm 36, the throw of the arms 30 will be shortened to a sufficient extent that the leaves 34 and 35 will not come in contact with the stacks of labels and no label will be picked up by the picker.

Furthermore, if, for any reason the label picker 30 should be prevented from completing its entire stroke induced by the movement of the cam 39, the operating rod, comprising the sections 37 and 40 would break at the joint 41. This may be caused by setting the screw 45 to the point where the sections are slightly out of alignment. There may be occasion when one or both of the label holders 28 or 29 might drop out of adjustment and project so far into the path of the picker as to provide an obstruction to the completion of the picker movement. Under these circumstances, the two sections 37 and 40 of the picker rod would break, thus relieving the strain on the rod and preventing distortion of the rod or even breaking of the rod.

It is to be noted that the label magazines 27 are stationarily mounted relative to the label pickers 30. To this end, the magazine 27 is mounted on a base or supporting member 27', being adjustable, however, on the base through the medium of an adjusting screw 27". Due to the fact that the label magazines 27 are stationarily mounted, being movable for adjustment only, a very nice relationship between the pickers 30 and the labels held in the magazine 27 may be obtained. As a result of this nice adjustment, the pickers will not strike the labels in the magazine so hard as to cause a thinning out of the glue film and to cause other label picker trouble. This adjustment permits of the engagement of the pickers with the labels supported in the magazine with just sufficient force to obtain contact between the pickers and the label and without sufficient force to cause misalignment of the pickers or to cause the labels to be improperly picked up from the magazines.

Figures 9, 10, 11, 12, 13:
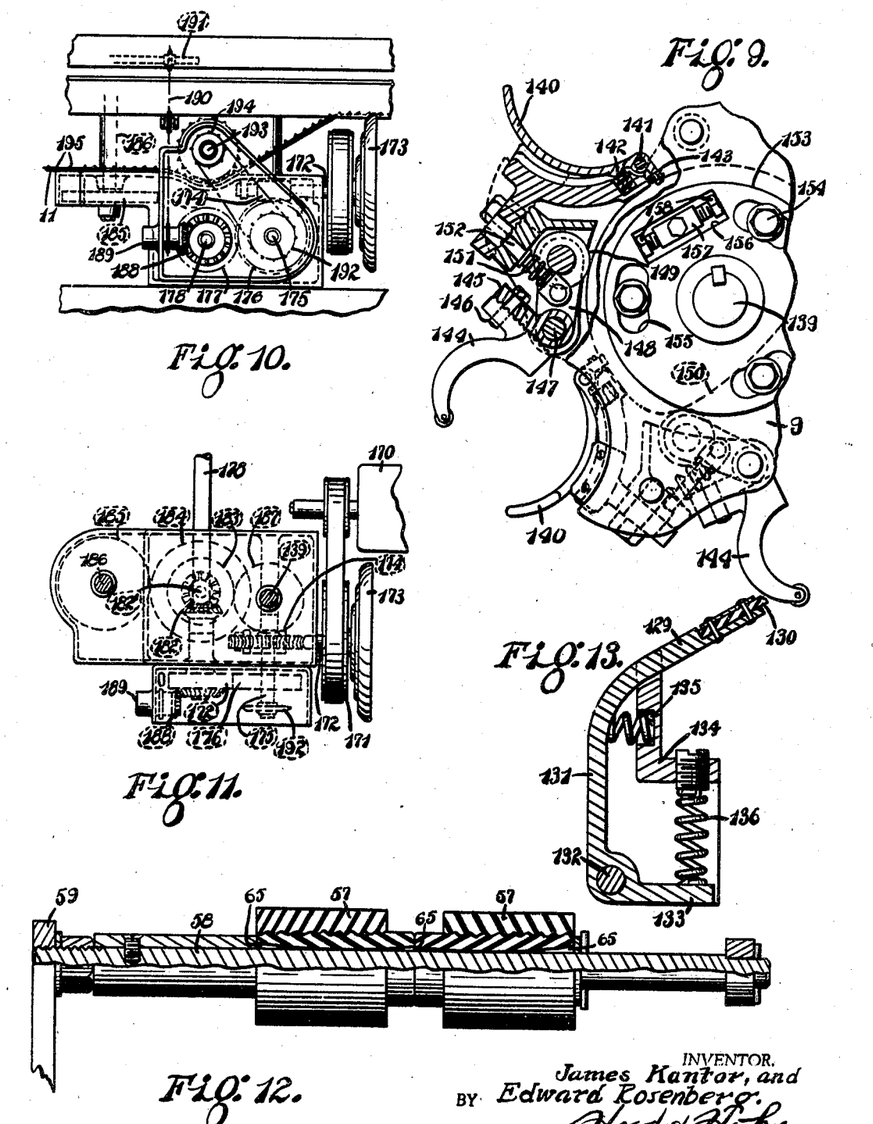
Fig. 9 is a detail plan, partly in section, of the outfeed grippers.
Fig. 10 is an elevation of the driving mechanism for the apparatus.
Fig. 11 is a plan view thereof.
Fig. 12 is an elevation, partly in section, of the glue applying rolls.
Fig. 13 is a detail plan, partly in section, of one of the wiper fingers.

Between each throw of the arms 30, a film of glue is applied to the faces of the leaves 34 and 35. To this end, we provide a glue pot 55 having operating therein a glue roll 56. Cooperating with this glue roll is a pair of glue-applying rolls 57 which are mounted to rotate on a shaft 58, which shaft is carried on a reciprocating slide 59. Reciprocating movement is imparted to this slide 59 by a rocking lever 60 pivoted at 61 to the frame and having a follower 62 operating in a cam track 63. The shaft 58 operates behind a pair of guide rails 64 stationarily mounted to prevent any give to the shafts as the rolls pass over the leaves 34 and 35. These rolls 57 are preferably of soft rubber and, as illustrated in Fig. 12, the bores of these rolls are enlarged as at 65 at each end, tapering toward the center until at the center point, the rolls are just sufficiently large to receive the shaft 58. As a result, these rolls can rock on the shaft 58, thereby compensating for any slight inaccuracies in the arms 30 or in the leaves 34 and 35. If the rolls were rigidly mounted and did not have such a rocking action, one of the arms 30 might be slightly bent or out of alignment and, as a result, glue would not be applied to both sets of leaves 34 and 35. As the glue applying roll 57 moves downwardly, it comes in contact with the roll 56 so that each of the rolls 57 receives a film of glue from the roll 56. As it moves upwardly, the arms 30 having been swung partway out, the glue carried by the rolls 57 will be applied to the leaves 34 and 35. After the glue has been applied, the rolls 57 are moved downwardly so that the arms 30, and their accompanying leaves, can continue in their outward swing into contact with the bottoms of the stacks of labels. Due to the fact that the leaves have been covered with adhesive, the bottom-most label will adhere to the picker and be removed from the stack as the picker swings back in its oscillation.

Figure 21:
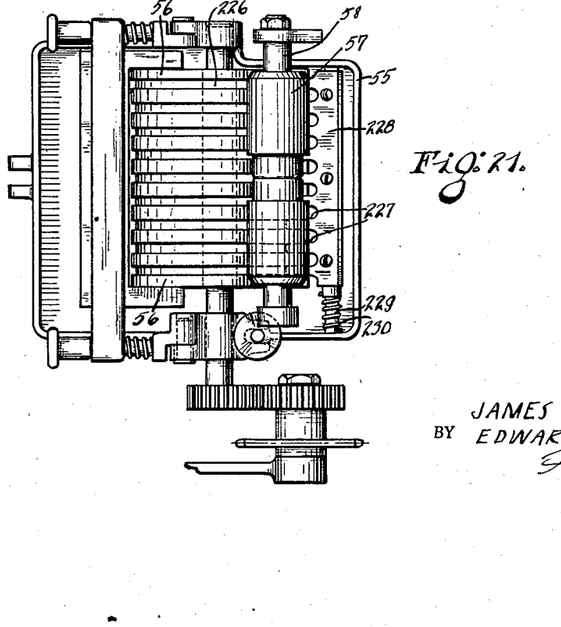
Fig. 21 is a detail plan of the label glue roll and associated parts.

As illustrated more particularly in Fig. 21, the glue transfer roll 56 operates within the glue pot 55. This transfer roll is positively driven and the face of the roll is grooved as at 226. Operating in the grooves 226 of the transfer roll 56 are comb fingers 227 carried by a comb 228 which is mounted on a rock shaft 229 biased in a direction to hold the fingers in the grooves through the medium of a coiled spring 230. The comb fingers 227 thus provide a scraper which will scrape off from the transfer roll any labels or fragments of labels which may drop thereon from the label magazines or which may drop off the picker fingers during the operation of transferring the labels from the magazines to the picker fingers. It is essential for the proper operation of the gluing mechanism that the glue roll 57 have an even thickness of glue thereon and this film must be evenly distributed. If, for any reason, labels or parts of labels should drop on the transfer roll 226, they would have a tendency to wipe off the glue from the transfer roll and from the glue roll, thus destroying the even distribution of the glue on to the glue roll.

The picker leaves, having thus received their labels, the picker is swung transversely into the path of the bottle as it moves with the rotating table. To this end, the hub member 31 is slid back and forth on the shaft 32 through the medium of a lever 66 pivoted as at 67 at its lower end to the frame and provided with a follower roller 68 operating in a cam track 69 on a cam 70. The parts are so timed that this movement of the picker into the path of the bottle takes place after the picker has been oscillated to its normal position away from the magazine and just before the bottle reaches the station to pass between the picker leaves 34 and 35.

Figures 7, 8, 19:
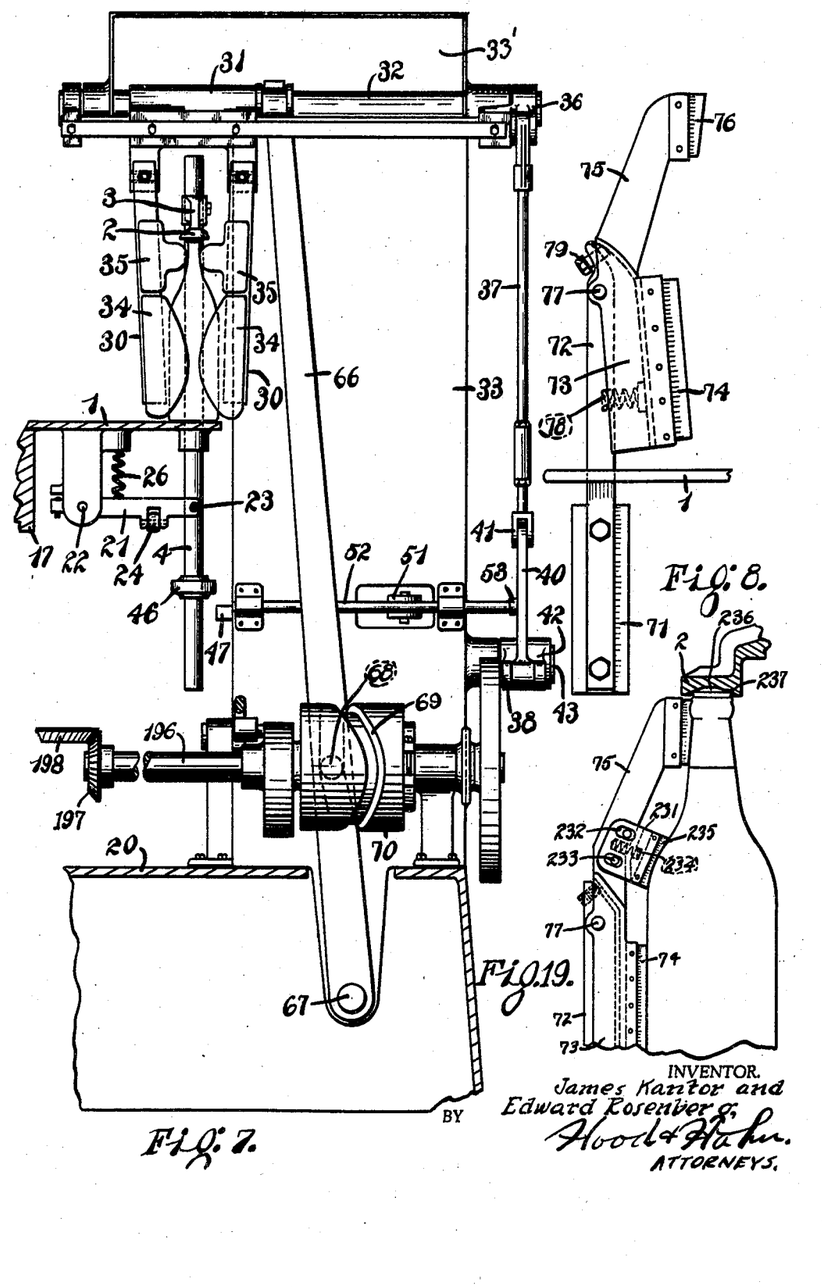
Fig. 7 is a partial front elevation of the label-applying mechanism.
Fig. 8 is a side elevation of a label-holding finger for holding the label in position after it has been applied by the structure illustrated in Fig. 7.
Fig. 19 is a side elevation of a modification of the holding finger shown in Fig. 8.

After the bottle has come in contact with the glued label, it is necessary that the label or labels be held on the bottle until the bottle reaches the stage where the labels are ironed around the bottle. To this end, associated with each bottle holder is a label holder. This label holder is mounted on an oscillating arm 71 mounted on and rotating with the table members 1. The label holder comprises a vertically extending supporting arm 72. At the upper end of this supporting arm is mounted a rocker comprising a bottom label holder arm 73 having a rubber face 74 and an upper label holding arm 75 having a rubber or flexible face 76. These two arms are formed in one piece and the one-piece member is pivoted at 77 on the arm 72. The two arms 73 and 75 are set slightly at an angle to one another and the arm 73 is biased in an outward direction by a coiled spring 78 interposed between the arm and the supporting arm 72. This arrangement permits of a rocking adjustment of the unit comprising the arms 73 and 75 to compensate for slight variations between the diameter of the neck of the bottle and the diameter of the bottom of the bottle, so that under all circumstances, the rubber holding pad 76 will engage the label at the neck of the bottle and the rubber holding pad 74 will engage the body label of the bottle. The outward movement of the bottom arm 73 is limited by an adjustable stop 79.

In Fig. 19, we have illustrated a modification of the label holder shown in Fig. 8. In the structure illustrated in Fig. 19, while the gripper fingers comprising the arm 72 and extension 75, as well as the bottle contacting member 73, are substantially the same as that illustrated in Fig. 8, we have provided an additional contact finger portion comprising an adjustable yoke 231 embracing the portion 75 and provided with slots 232 engaging over pins 233. This gripper member is biased into a position to engage the bottle through the medium of the coiled spring 234 and is provided with a rubber contact face 235 which may be shaped to conform to that portion of the bottle which is adapted to be engaged. In the structure illustrated, the rubber face is adapted to engage a label which may be applied to a portion of the bottle intermediate of the neck and the body. Also, as illustrated in Fig. 19, the gripper cone 2 has its under face recessed as at 236 which recess is provided with a shoulder 237. Such a shoulder will prevent the pressure of the label holding finger from having a tendency to force the gripper 2 off the bottle. If the recess 236 were merely cone-shaped, there would be a tendency for the top walls to act somewhat in the nature of a cam, permitting the pressure to force the gripper 2 upwardly.

The arm 71 is one arm of a bell crank lever pivoted on the pivot member 80 mounted in the rotating head 17 and the opposite arm 81 of this bell crank lever is bifurcated and carries a roller 82 adapted to engage a cam 83 (Fig. 2). There are three of these cams 83, one mounted above the other, and the arms 81 carrying the rollers 82 are arranged in threes, one below the other. Each of the cams 83 is mounted on a shoulder 84 on a head bolted to the center sleeve 19 and, therefore, stationarily mounted. In order that each of these cam members 83 may be adjusted for properly timing the swing of the label holders, each cam is bolted to its shoulder through a series of cap screws 85 passing through slots 86 in the cam, and each cam is provided with a guide pin 87 operating in a groove 88 formed in its shoulder. For nice adjustment of the cam, each shoulder is provided with an upwardly extending lug 89 projecting into a slot of the cam, and this lug is provided with adjustable stop screws 90 which bear against the side walls of the slot in the cam. By this arrangement, by loosening the clamping bolts 85 and adjusting the stop screws 90, each cam may be nicely adjusted to properly time the movement of the label holder so that it will engage the label or labels immediately after the same have been placed on the bottle.

The cams 83 are so disposed as to cooperate with the rollers 82 on the arms 81 of the levers supporting the label holders to move the label holders in their disengaged position. The high spots of the cams operate to move the label holders in their retracted or disengaged position, while the low spots of the cams permit the holders to move into their engaged position in contact with the container. This engaged movement is effected through the medium of coiled springs 81'. Therefore, the label holder fingers are biased in their engaging position and positively moved to disengaged position, thus if, for any reason, the arms 71 would be prevented from moving to their full engaging position, no damage would be done to the parts as if, for any reason, the arm 71 should not move to its full engaged position, the roller 82 on the arm 81 would not come in contact with the cam and there could be no straining or jamming of the parts.

Figure 3:
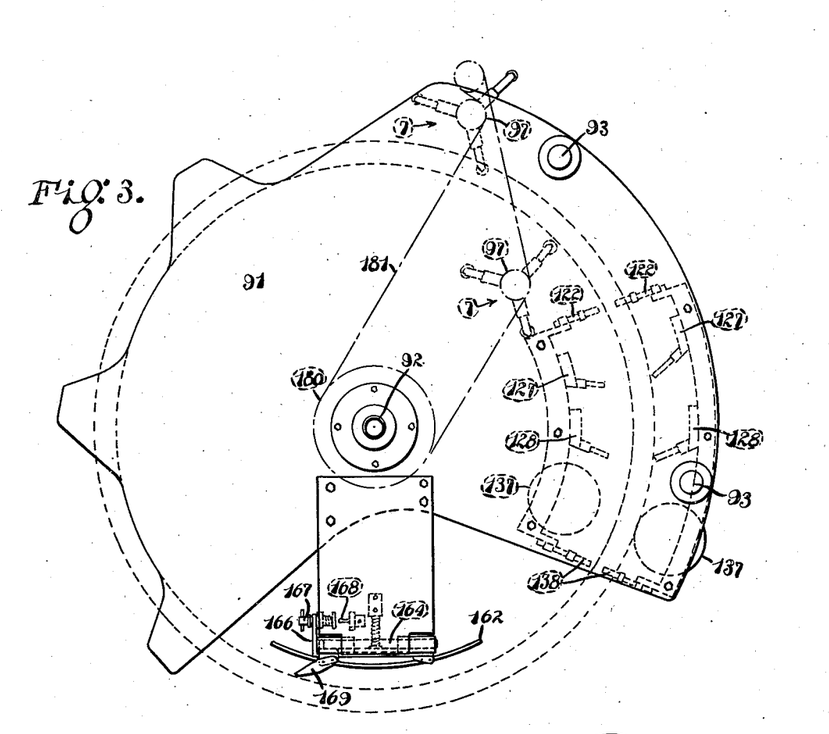
Fig. 3 is a plan view showing the disposition of the label ironers for wrapping labels around the container and the label wipers.
Figure 4:
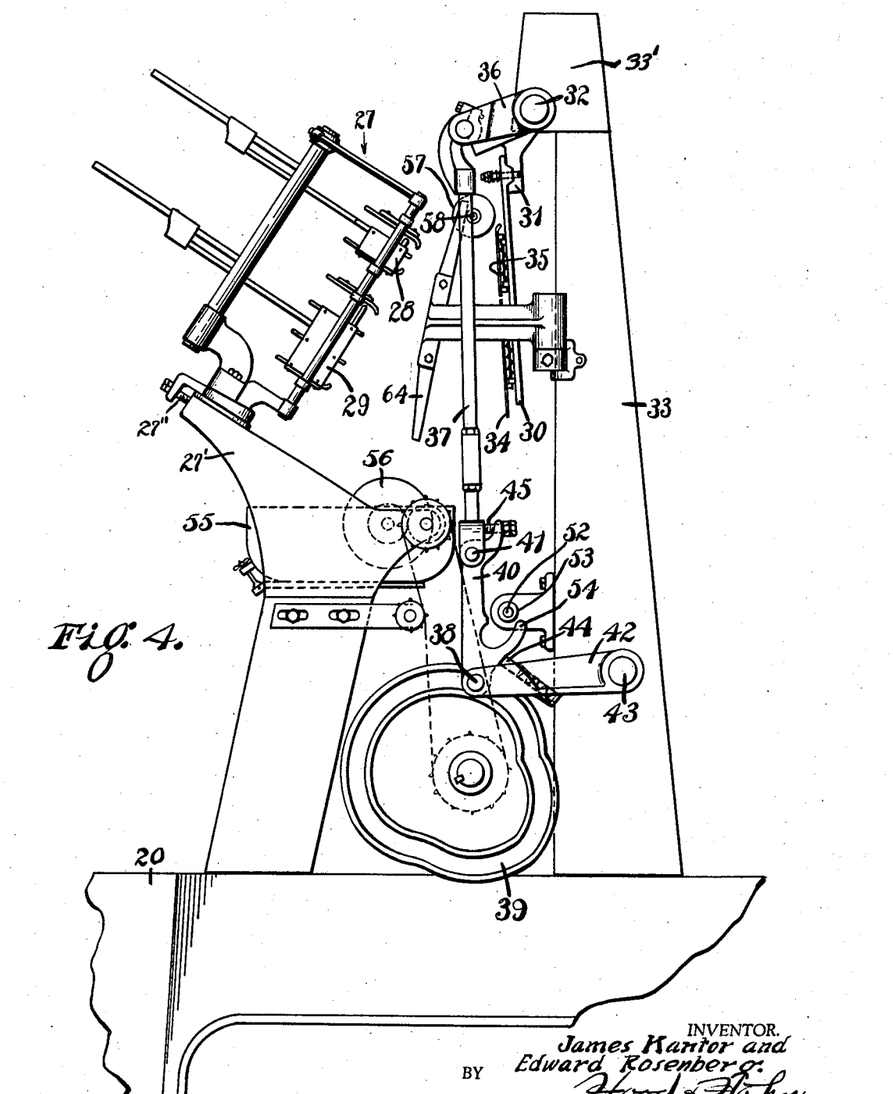
Fig. 4 is an elevation of the label picker and its associated drive.

After the labels have been applied to the bottle, the bottle then passes to the wipers or ironers 7. There are two of the ironers 7, one located beyond the circumference of the path of the bottle, and the other located within the circumference of the path of the bottle, as indicated in Fig. 3. These ironers or wipers are supported from a top head 91, non-rotatably supported on a standard 92 fitting within the sleeve 19'. Supporting posts 93 extend up from the base and assist in supporting the head.

The construction of each of these wipers is substantially the same and, therefore, a description of one will be sufficient. Depending from the head 91 is a bracket 94 which supports therein a rotary shaft 95. This shaft extends through a bearing sleeve 96 on the bracket 94 and has pinned thereon a driving sprocket 97. This sprocket is mounted between the bearing 96 and the upper bearing 98 depending from the head 91 and, being pinned on the shaft 95, supports the shaft against longitudinal displacement. Suitable bearing washers 99 are interposed between the sprocket 97 and bearing sleeve 96. The shaft 95, at its bottom, is provided with a rotatable sleeve 100 which has keyed thereon a hub 101, which hub carries a plurality of radial arms 102 radially adjustably socketed in split sockets 103 on the hub 101. These sockets are split so that the arms 102 may be radially moved inwardly and outwardly and then clamped in their adjusted position. Each of the arms 102 carries a vertical pin 104 on which is rotatably mounted a wiper roll 105. This roll is preferably of soft rubber and we have found that by the use of rolls formed of sponge rubber, with a non-sponge or non-porous surface on the periphery of the rolls, the rolls are much more efficient. The soft sponge portion of the rolls permits the same to adjust themselves to slight irregularities in the surface of the bottle and, at the same time, the hard non-sponge periphery thereof prevents the sponge rubber from becoming clogged and filled with paste which necessarily accumulates on the surface of the rolls as they wipe around the bottle.

The hub 101, while keyed on the sleeve 100 so that it will rotate therewith, is vertically adjustable on the sleeve to adjust it for the height of the label, applied to the neck of the bottle, and to this end, we provide the hub 101 with the set screws 106, which lock the hub in its vertically adjusted position on the sleeve 100. This sleeve 100, at its upper end, is provided with a drive gear 107 adapted to be driven by a mutilated drive gear 108 which has a limited number of teeth in its periphery, which teeth act somewhat in the nature of a rack for the purpose of driving the gear 107. This mutilated gear 108 is mounted on a hub 109 through the medium of cap screws 110 operating in elongated slots in the gear so that the tooth portion of the gear may be adjusted around for the purpose of proper timing of the drive. The hub 109 is keyed on a drive shaft 111 suitably rotatably supported in a bearing 112 mounted on an arm 113 extending from a hub 114 secured on the shaft 95. Therefore, as the shaft 95 rotates, moving the bearing 112 around, the teeth of the mutilated gear 108 engaging the gear 107 will rotate the sleeve 100, the shaft 111 being held against rotation in its bearing 112. For maintaining the shaft 111 against other than a slight rotative movement in its bearing 112, a collar 115 is pinned to the top end of the shaft, which collar carries an offset roller 116 and this roller is adapted to contact with a cam 117 secured to the under face of the bracket 94. The cam 117 is secured to the under face of the bracket 94 through the medium of cap screws 118 operating in elongated slots in the cam so that the cam may be rotatively adjusted. For securing a fine adjustment of the cam and to insure it against rotation after having once been adjusted, the cam is provided with an upwardly extending lug 119 adapted to project between a pair of set screws 120 operating in offset lugs 121 on the bracket 94. Due to the fact that the shaft 111 is held relatively stationary by the engagement of the roller 116 with the cam 117, as the bearing 112 is rotated, the engagement of the teeth of the gear 107, will rotate the arms 102 and their accompanying rollers 105 in a clockwise direction, referring more particularly to Fig. 1. As the platform 1, and with it the bottle, is rotating in a clockwise direction, the soft roller will be brought in contact with the label on the bottle neck. In order to maintain the roller in contact with the label and bottle neck, and to cause the roller to follow the bottle neck, it is desirable that the arms 102 rotate for a short period at a slightly slower speed. This is accomplished by providing in the cam 117 a relative low spot so that the roller 116, in following the cam, will have a tendency to swing the rack with the travel of the bearing 112, thus somewhat slowing down the drive of the gear 107. After the bottle has passed the roller and in order to still maintain the roller in contact with the neck of the bottle, it is desirable that the arm move faster, in order that the roller will keep up with the bottle. Under these circumstances, the roller 116, riding a high portion of the cam, will swing the rack of the gear 108 in a direction counter to its direction of rotation, thus speeding up the drive of the gear 107 and rotating the arms 102 just a little faster. After the bottle has passed the wipers beyond the circumference of the bottle travel, it comes in contact with the second set of wipers 7 which are arranged within the circumference of the bottle travel to complete the wrapping of the label around the bottle neck. The drive and construction of this second set of wipers is the same as that heretofore described.

Figure 18:
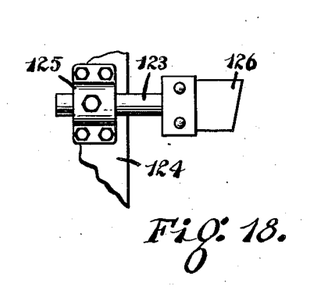
Fig. 18 is an elevation of a wiper finger.

After the bottle passes from between the rotary wipers, the bottle passes between a pair of top wiper fingers 122. Each of these fingers, as shown in Fig. 18, comprises an inwardly extending arm 123 mounted on a vertical post 124. This arm is held in a clamp 125 which provides transverse adjustment thereof and the arm is tipped with a rubber wiper 126. These wipers are spaced very slightly apart so that as the bottle passes between the same, the flexible rubber fingers 126 wiping around the top label will help smooth the label out.

After the bottle has passed through the top label wipers, the bottle passes between two pairs of bottom wiper fingers 127 and 128. All of these wiper fingers are the same and are substantially of the construction illustrated in Fig. 13. Each of these wipers 127 and 128 comprises an arm 129 set in a position to be slightly inclined relative to the line of movement of the bottle. The arm is tipped with a rubber finger 130. This arm 129 has an extension 131 which lies substantially parallel to the line of movement of the bottle travel and extension 133 is pivoted at 132 to the frame. A right angle extension 133 is attached to the arm 131 and between this right angle 133 and between the arm itself and a stationary stop 134, we provide biasing springs 135 and 136 which maintain the arm more or less flexibly centered.

After passing between the wiper fingers 128, the bottle passes between bottom label rollers 137 which are mounted on vertical axes and which are soft rubber rollers, preferably being formed with a series of openings extending longitudinally therethrough to provide a relatively soft roll. These rollers tend to smooth the bottom label and assist in pressing the same firmly against the bottle so that the glue will adhere.

Figure 20:
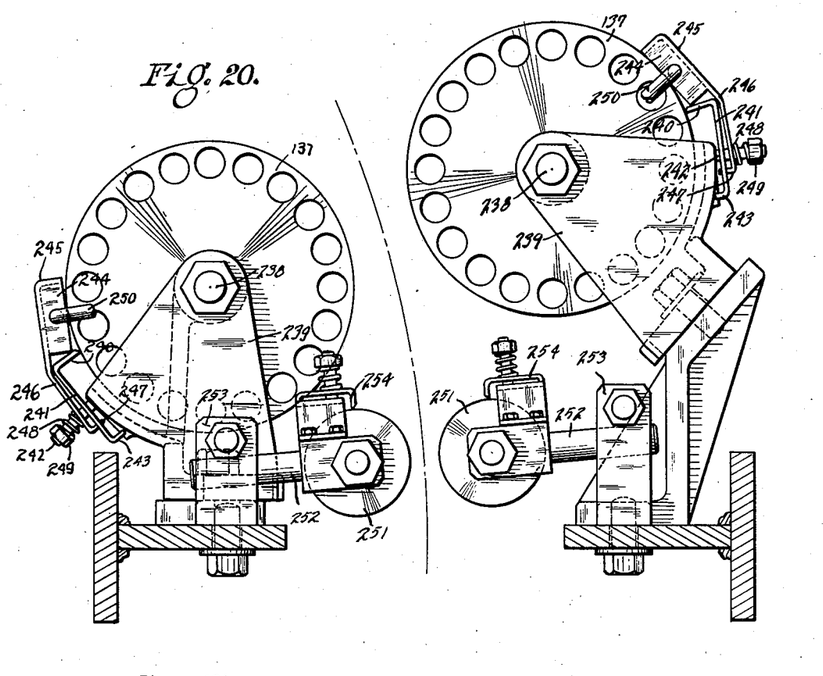
Fig. 20 is a detail plan showing means for moistening and cleaning the final label rollers.

It is desirable that these rollers 137 be kept clean and free from the accumulation of glue which might occur as the result of their bearing upon the labels. Therefore, as illustrated in Fig. 20, we provide a cleaning mechanism. As shown in this Figure 20, the rollers 137 have their shafts 238 mounted in yokes 239 which are suitably bolted to the frame work of the machine. Carried on these yokes 239 is, for each roller, a scraper finger 240 extending the length of the roller and having a supporting back 241 through which passes supporting pins 242. The back 241, at its rear end, is provided with a downturned finger 243 which bears against a portion of the yoke 239. Adjacent the scraper finger and in advance thereof is supported a moistening pad 244 which comprises a hard felt pad carried within a housing 245 having extending rearwardly therefrom supporting fingers 246. These fingers also have passing therethrough the supporting pins 242 and are provided with downturned portions 247 likewise adapted to bear on a portion of the yoke 239. Coiled springs 248 are interposed between adjustable nuts 249 on the pins 242 and the fingers 246 so that both the scraper fingers 240 and the pads 244 are resiliently pressed against the surface of the rollers. Moisture is supplied to the pads 244 by suitable feed pipes 250 connected with a suitable source of water supply and just sufficient water is allowed to flow to the pads to keep the same reasonably moist, so that, as the rollers 137 pass over the pads, any glue which may be picked up therefrom is thoroughly moistened and this moistened glue may readily be scraped from the surface of the rolls by the scrapers 240.

If desired, additional rollers for the neck labels may be supported adjacent the rollers 137 and, as shown, these may be rollers 251 carried on arms 252 adjustably supported in brackets 253 supported from the same brackets which support the yokes 239. These rollers likewise may be provided with spring-pressed scraper fingers 254.

From the bottom label rollers 137, the bottle then passes out between a pair of top label wipers 138 of the same construction as the top label wipers 122.

Figures 14, 16, 17:
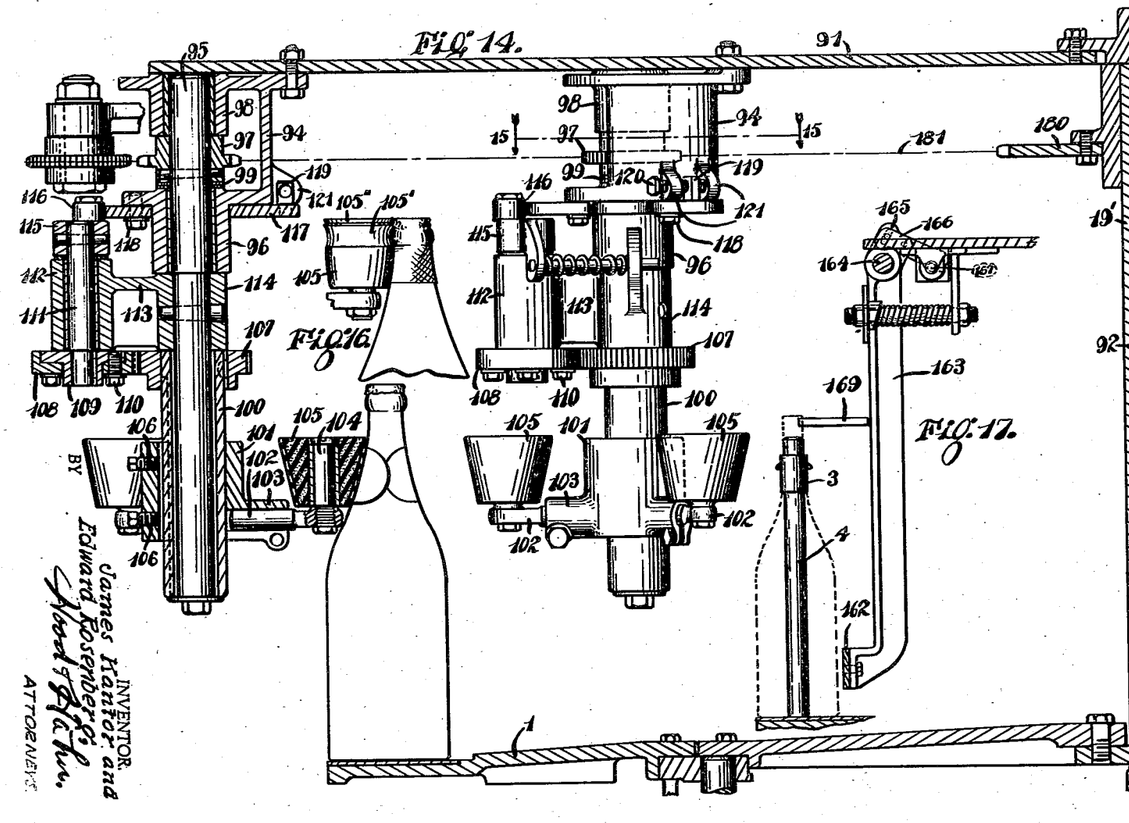
Fig. 14 is an elevation, partly in section, of the label ironer roll mechanism.
Fig. 16 is a detail elevation of a modified label ironing roll.
Fig. 17 is an elevation of an automatic cutoff mechanism.
Figure 15:
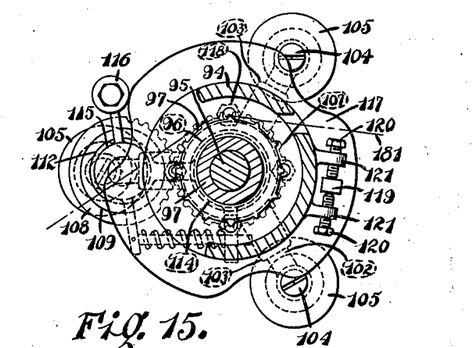
Fig. 15 is a section on the line 15—15 of Fig. 14.

By the time the bottle has passed from between the last set of wipers, the bottom label has been smoothly and firmly applied to the bottle and the top label has been completely wrapped around the neck of the bottle and firmly attached thereto. This top label sometimes comprises a band which is wrapped around the neck intermediate of the top and bottom portion of the bottle and in some instances comprises a foil or wrapper which is wrapped around the top proper of the neck. When a foil or similar label is wrapped around the top of the neck of the bottle, we prefer to use a type of roller wiper as illustrated in Fig. 16. As shown in this figure, the roller 105 is provided in its periphery with an annular groove 105' which conforms to the large head generally formed at the top of the neck of the bottle and a second small groove 105'' which conforms to the smaller bead at the extreme tip of the neck of the bottle. Due to the fact that the pin 104 is removable from the arm 102, one type of roller may be readily substituted for the other type.

After the bottle has received its labels, as heretofore described, it then passes to the outfeed star 9. At the time that the bottle passes into a position to be received by the outfeed star, the gripper 2 is raised therefrom. It is quite essential that the bottle be not tilted or upset as it is delivered from the labeling machine to the outfeed conveyor by the means of the outfeed star and it is quite essential that the bottle be firmly gripped in the outfeed star. Therefore, the grippers of the outfeed star must be very accurately timed both as to gripping and releasing the bottle. The outfeed star 9 is mounted on a vertical shaft 139 which is driven in timed relation to the remaining parts, and this star is provided with a plurality of relatively stationary arcuate gripper fingers 140. Each finger is pivotally mounted on the under face of the star 9 at 141, being biased in one direction by a coiled spring 142 in the star frame against an adjustable stop 143. This arrangement maintains the gripper finger 140 in a relatively stationary position, while permitting a certain amount of give to the finger to accommodate the variations in diameters of the bottles to be received thereby.

Cooperating with each relatively stationary gripper finger 140 is a movable gripper finger 144 which is mounted on an arm 145 through the medium of a cap screw 146 which passes through an elongated slot in the arm so that the finger or arm 144 may be adjusted toward or away from the finger 140. The contact surfaces between the finger 144 and its arm 145 are serrated so that there will be no danger of slippage between these parts after adjustment is made. This arm 145 is mounted on an oscillating shaft 147 which carries an oscillating arm 148 provided with a roller 149 riding on a cam 150, stationarily mounted. This cam is so disposed as to its cam surfaces as to permit the arm to swing in and out of gripping position. The arm is swung into gripping position by the roller riding over the high spots of the cam and is biased into open position through the medium of a coiled spring 151 surrounding a guide pin 152. The cam surfaces are so disposed that as the gripping arm moves into position, during the rotation of the outfeed star, for the reception of a bottle, the swingable arm 144 is swung into open position. As soon as the bottle passes into position to be gripped, the gripping arm is swung into closed position, securely gripping the bottle between it and the resilient arm or finger 140. When the outfeed star 9 during its rotation, positions the bottle on to the conveyor 11, the roller 149 of the arm 148 rides on a low spot of the cam, permitting the gripping arm 144 to swing to open position.

It is extremely important that, in order to effect accurate timing of the opening and closing of the arm 144, the relation between the cam 150 and the outfeed star should be nicely adjusted. To this end, the cam 150 is stationarily secured to the top of the gear box frame as at 150' (Fig. 2). The shaft 139 passes through the star 9 and is keyed to a plate 153, which plate, through the medium of cap screws 154, is bolted to the frame of the outfeed star 9. Cap screws 154 pass through the elongated slots 155 so that the star may be adjusted circularly for the proper timing of the parts. In order that a nice adjustment may be obtained and to insure against slippage of the star 9 in relationship to the plate 153, the plate 153 is provided with an elongated slot 156, through which projects a lug 157 on the star frame 9, and into this lug are screwed adjustable stops 158 which abut against the end walls of the slot 156.

The bottle is delivered from the outfeed star to the conveyor 11 which also acts as a conveyor for delivering the bottle or the bottles to the infeed star 8. It is essential that the bottles be delivered to the infeed star in accurately spaced relation, although, as the bottles are moved along the conveyor, initially they are crowded close, one against the other. In order to obtain the proper spacing of the bottles by the time they arrive at the point to be picked up by the infeed star, we provide a spacing screw 159 having a gradually increasing pitch. The small pitch is at the receiving end of the screw so that the bottles, in their narrow spaced relation, will be picked up by the threads of the screw, and, as they move forward, under the combined influence of the rotation of the screw and of the conveyor 11, the screw will gradually effect an accurate spacing of the bottles so that by the time each bottle reaches a position to be picked up by the infeed star 8, it is accurately spaced from the next succeeding bottle and is in absolute position to be received by the star.

It is to be noted that the feed screw 159 has its bearing, at least at one end, so mounted that it is adjustable relative to the conveyor 11 to compensate for oversized bottles or the like.

The conveyor 11 is therefore a relatively fast speed conveyor. When the bottles are delivered on this conveyor by the outfeed star 9, they are, obviously, delivered in a widely spaced relationship. Due to this widely spaced relationship, there is some danger, under the influence of the momentum of the travel of the bottles and for other reasons, of the bottles tilting and dropping down into a horizontal position on the conveyor. Therefore, immediately after the bottle is delivered to the conveyor 11, it is shifted, through the medium of suitable guides 160 to a relatively slow speed conveyor 161 and as a result, with the bottles being delivered by the high speed conveyor 11 on to the relatively slow speed conveyor 161, the bottles will be crowded or bunched, so that one bottle will help support the other and the tilting is obviated.

It is obvious that other means for slowing down and more closely spacing the containers as they are delivered from the labeling machine may be used in lieu of the slow speed conveyor 161. It would be possible, for instance, to use a feeding screw having its axis parallel with the line of movement of the bottles and the pitch of the screw or worm gradually decreasing from its intake to delivery end.

If, for any reason, a bottle, after leaving the label wipers, should become displaced, it might not enter between the gripper fingers 140 and 144 and might be crushed or at least it might throw the machine out of balance and, in view of the fact that this particular machine operates at extremely high speed being developed for the purpose of labeling 190 bottles or more per minute, this would be disastrous.

Under these circumstances, with a bottle displaced, the bottle would strike the safety stop guide 162 which would be in the path of the misaligned bottle, and deflect this guide. This guide is hung at the lower end of a swinging arm 163 connected on an oscillating shaft 164. The shaft 164 carries a crank arm 165 in turn provided with a latch arm 166. This latch arm maintains a spring biased pin 167 in its retracted position. In its projected position, the pin will strike a valve stem 168 controlling the air pressure to the air control clutch connecting the driving mechanism with the driving motor. As soon as this valve is opened, the air in the air clutch is released, thereby permitting the clutch to disengage, stopping the entire machine. It is obvious, therefore, that with the deflector guide 162 deflected through a misaligned bottle, the latch 166 will release the pin 167, permitting the stopping of the entire machinery.

It is further necessary to provide means for insuring the stopping of the machine in event the gripper 2 should not descend and properly grip a bottle. It would be dangerous for the bottle to start through the machine unless firmly gripped in position. Therefore, if, for any reason, the rod 4, on which the gripper supporting arm 3 is mounted, should fail to descend under the influence of the spring 26, the upper end of this rod would be in the path of a cam arm 169, striking this cam arm and rocking the arm 163 to likewise release the latch 166 thereby stopping the machine.

The drive of the various parts of the machine is effected through the medium of a driving motor 170. This motor is belted to a driving pulley 171 on a main drive shaft 172 and connected to the main drive shaft through the medium of an air clutch 173. One valve for controlling the operation of this air clutch is the valve having the valve stem 168, heretofore described. The shaft 172, through the medium of a worm drive 174, drives a shaft 175 carrying a gear wheel 176 which, in turn, drives a gear 177 driving the shaft 178, and this shaft, through a bevel gear drive 179, drives the sleeve 18 supporting the bottle carrying table, which sleeve, through the frame 17, is connected with the sleeve 19', carrying at its upper end a sprocket 180 which, through the medium of a chain drive 181 is adapted to drive the rotary wipers 7. The shaft 178 is provided with a bevel drive 182 for driving a stub shaft 182' carrying the drive gears 183 and 184 (Figs. 3, 10 and 11). The gear 184, in turn, meshes with a gear 185 driving the vertically disposed shaft 186 carrying the infeed star 8, while the gear 183 drives a gear 187 mounted on the shaft 139, in turn carrying and driving, at its upper end, the outfeed star 9.

A bevel gear drive 188 drives a shaft 189 which is connected, through a suitable sprocket chain drive 190 with the shaft 191 of the feeding and spacing screw 159.

For driving the conveyor 11, the shaft 175 is provided with a sprocket drive 192 driving a stub shaft 193, in turn provided with a sprocket wheel 194 meshing with links 195 on the under face of the conveyor 11.

The cams 39 for operating the picker fingers and causing them to oscillate toward and away from the magazine, and the cams 70 for reciprocating the pickers into and out of the path of movement of the bottle, are mounted on shafts 196 radially disposed and having at their inner ends, bevel gears 197, meshing with the bevel gear 198 of the bevel gear drive 179. It is, therefore, apparent that the entire apparatus is driven from the driving motor 170 through the air clutch 173. Obviously, if the air clutch is disconnected, the entire mechanism is brought to a standstill and thus, when the control valve 168 is operated to release the air clutch as the result of the incorrect positioning of the bottles, as heretofore described, the entire apparatus will be brought to a stop.

Obviously, other hand controlled air valves, controlling the operation of the air clutch 173, may also be provided if desired.

It is to be noted that each of the container-supporting elements 1 comprises a more or less unitary structure. Each of these elements, through the medium of bolts 199 is secured to the supporting frame 117 and, therefore, in event of damage to the supporting element itself, or to the bottle clamping element, including the rod 4, the arm 3 and the cone clamp 2, the unit may be removed by loosening the bolts 199.

At the same time that this unit 1 is removed, the operating arm 21 and its associated supporting shaft 22, may be moved therewith, due to the fact that this shaft 21 is supported in an extension casting 200 on the under face of the unit 1, which extension casting itself is bolted to the under face by the bolts 201. Therefore, when the unit 1 is removed, the operating arm 21 and its associated parts, will be removed therewith or, if desired, the operating arm 21 and its associated parts, may be removed independently thereof.

We claim as our invention:

1. In a labeling machine, in combination, a rotary table, a plurality of container holders disposed about the periphery of said table in equal spaced relationship, a plurality of label-applying devices arranged in series and beyond the circumference of said table and each including a magazine for supporting a stack of labels, an oscillating picker arranged to move to and from said magazine and means for applying adhesive to the face of said picker, means for moving each of said pickers radially in and out of the path of the containers, the movement of said pickers being timed to move the pickers in the container path successively to provide a relatively long interval of time between the movement of each picker into the bottle path, a plurality of label holding fingers, one for each container holder pivotally carried on said table to swing on axes vertical to said table, and a plurality of label holding operating means, one for each picker, timed with its label picker to swing a label holder on its axis into engagement with the container when the container receives a label from a picker, and means for wiping the applied label on to the container during the rotation of the table.

2. In a labeling machine, in combination, a rotary table, a plurality of container holders disposed about the periphery of said table in equal spaced relationship, a plurality of label-applying devices arranged in series beyond the circumference of said table and each including a magazine for supporting a stack of labels, an oscillating picker arranged to move to and from said magazine, and means for applying adhesive to the face of said picker, means for moving said pickers radially in and out of the path of the containers, timed to move said pickers in the path of the containers successively to provide a relatively long interval of time between the movement of each picker into the container path, a plurality of label holding fingers, one for each container holder and each including an oscillating arm pivoted on said table to swing on an axis vertical to the table, a plurality of cams relatively stationary for swinging the label holding arms, the number of said cams coinciding with the number of label pickers, and said cams being so disposed as to permit a holder to move into engagement with a container upon the application of a label to said container by a picker, and means for wiping the applied label on the container during the rotation of the table.

3. In a labeling machine, in combination, a rotary table, a plurality of container holders disposed about the periphery of said table in equally spaced relationship, a plurality of label applying devices arranged in series beyond the circumference of said table and each including a magazine for supporting a stack of labels, an oscillating picker arranged to move to and from said magazine, and means for applying adhesive to the face of said picker, means for moving said pickers successively radially in and out of the path of the containers, said successive movements of the pickers providing a relatively long interval of time between the movement of each picker into the path of a container, a plurality of label holding fingers, one for each container holder pivotally mounted on said table to swing on an axis vertical to the table and each including an arm pivoted on said table, a plurality of cams for oscillating said arms, the number of cams corresponding to the number of pickers, said cams being so adjusted as to move a holding finger into engagement with a container immediately upon the application of a label by a label picker to said container, means for rotatively adjustably supporting said cams in a relatively stationary position to permit of an accurate adjustment of said cams for an accurate timing of the movement of said fingers relative to the movement of the pickers, and means for wiping the applied label on the container during the rotation of the table.

4. In a labeling machine, in combination, a rotary table, a plurality of container holders arranged about the periphery of said table in spaced relationship, a label holding finger for each container holder, a bell crank arm for each finger pivoted on the table to swing on an axis vertical to the table and adapted to support a finger, a plurality of cams stationarily mounted about the axis of said table for cooperating with the bell crank arms of said fingers to successively move the fingers into and out of engaging relationship with the container holders, and means for adjustably supporting each of said cams in its relatively stationary position to permit a relative rotative adjustment of said cams, each independently of the other.

5. In a labeling machine, in combination, a rotary table, a plurality of bottle clamps mounted about the circumference of said table in spaced relationship and each including a vertically reciprocable clamp supporting rod, a label applying mechanism disposed beyond the circumference of said table and including a label supporting magazine, and an oscillating picker arm movable to and from said magazine to move the picker arm in contact with the labels in said magazine and reciprocating radially with respect to said table to move said picker arm into and out of the path of the container holders, means for oscillating said picker arm, and means operated by a holder clamping rod when a container is not clamped therein for shortening the oscillating movement of said picker fingers toward said magazine.

6. In a labeling machine, in combination, a rotary table, a plurality of container clamps arranged about the circumference of said table in spaced relationship and each including a reciprocating rod carrying a clamp, label applying means disposed beyond the circumference of said table and including a label magazine, an oscillating shaft disposed parallel to the face of said magazine and radial relatively to said table, a label picker mounted on said shaft to oscillate therewith and movable longitudinally on said shaft to move into and out of the path of the container clamps, a crank arm mounted on said shaft, a reciprocating rod for oscillating said crank arm to thereby oscillate the shaft and move the picker into and out of engagement with the labels supported in said magazine, and means moved into operative position by a bottle clamping rod when no bottle is clamped in said clamp for shortening the throw of said reciprocating rod to thereby shorten the oscillation throw of the picker.

7. In a labeling machine, in combination, a rotary table, a plurality of container clamps mounted on said table and including a vertically movable clamp supporting rod, label applying means disposed beyond the circumference of said table and including a label supporting magazine, an oscillating shaft disposed radially with respect to said table and parallel to said magazine, a picker mounted to move longitudinally of said shaft and to oscillate therewith, a crank arm connected to said shaft, a reciprocating pitman for driving said crank shaft comprising two sections jointed together, means for normally maintaining said sections in axial alignment, and tripping means moved into operative position by a container clamping rod when no container is clamped therein for breaking the joint of said pitman rod to thereby shorten the effective length thereof and thus shorten the effective throw of the rod.

8. In a labeling machine, in combination, a rotary table, a plurality of container supports mounted on said table in spaced relationship, label applying means associated with said table and disposed without the circumference of said table including a magazine for supporting the labels in stacked relationship, a picker associated with said magazine and oscillating to and from said magazine and radially movable into and out of the path of said container holders and comprising a pair of spaced apart label supports between which the container is adapted to pass when the picker is moved into the path of said container, and means for applying an adhesive to said label supports comprising a vertically reciprocating roll adapted, during its reciprocation, to engage the face of said supports, said roll including a pair of separate sections rotatably mounted on the shaft, and each section contacting the shaft only at a point intermediate of its ends.

9. In a labeling machine, in combination, a rotary table, a plurality of container supports mounted on said table in spaced relationship, label applying means associated with said table including a magazine for supporting the labels in stacked relationship, a picker associated with said magazine and oscillating to and from said magazine and radially movable into and out of the path of said container holders and comprising a pair of spaced apart label supports between which the container is adapted to pass when the picker is moved into the path of said container, and means for applying an adhesive to said label supports comprising a vertically reciprocating roll adapted, during its reciprocation, to engage the face of said supports, said roll including a pair of roll sections rotatably mounted on a shaft, the bores of said sections receiving said shaft being gradually enlarged from intermediate of the ends of the roll section to the end of the section.

10. In a labeling machine, in combination, a rotary table, a plurality of container supports mounted on said table in spaced relation, an infeed star for delivering the containers to said supports in spaced relationship, and an outfeed star for removing the containers from said supports, said outfeed star including a rotatable support, a relatively stationary container-engaging finger mounted on said support, a movable container gripper finger associated with said relatively stationary finger comprising an arcuate gripper member, an arm pivotally mounted on said support and a second arm disposed at an angle to said first-mentioned arm, and means for adjustably securing said gripper finger on said angularly disposed arm.

11. In a labeling machine, in combination, a rotary table, a plurality of container supports mounted on said table in spaced relationship, an infeed star associated with said table for delivering the containers to said supports in spaced relationship and an outfeed star for receiving the containers in said supports, said outfeed star comprising a rotary support, a relatively stationary finger mounted on said support for receiving a container and a gripper finger movable relatively to said stationary finger, an operating lever having a pivotal mounting and adapted to have its free end engage a relatively stationary cam, an arm carried by said lever and disposed at an acute angle to said lever, means for adjustably supporting the gripper finger on said arm to permit adjustment of the gripper finger toward and from the relatively stationary finger, and a carrying member for the pivot of said lever mounted on said support and adjustably carried thereby to permit an adjustment of the gripper finger in a direction susbtantially parallel to the engaging finger.

12. In a labeling machine, in combination, a rotary table, a plurality of bottle supports mounted on said table in spaced relationship, an infeed star for delivering the containers to said supports in spaced relationship, an outfeed star for receiving the containers from said supports and having a plurality of container receiving pockets, said star comprising a rotary support and each pocket comprising a relatively stationary finger pivotally mounted on said support and spring-biased in engaging position, a pivotally mounted gripper finger, a lever connected with said gripper finger and a relatively stationary cam engaged by the free end of said lever for moving the gripper finger toward the relatively stationary finger and in gripping position.

13. In a labeling machine, in combination, a rotary table, a plurality of container holding means mounted on said table in spaced relationship and including a vertically movable clamping member movable downwardly when in clamping position, a drive for said table including an air pressure operated clutch, a valve for controlling said air pressure, normally inoperative means for operating said valve to cause said clutch to release, and a trigger projecting into the path of said vertically movable clamp for rendering said valve control means operative when engaged by said clamp, said clamp being out of position to engage said trigger when the clamp is lowered to secure a container in position upon the table.

14. In a labeling machine, in combination, a rotary table, a plurality of container clamping members arranged on said table in spaced relationship, a drive for said table including an air operated clutch, a valve for controlling said clutch, means for operating said valve to cause said clutch to disengage, a trigger for holding said means out of operative position, and a strike projecting in the path of the container holding clamps when said clamps are in raised inoperative position for releasing said trigger to cause the release of said clutch.

15. In a labeling machine, in combination, a rotary table having a plurality of container supports mounted thereon in spaced relation and rotatable at a constant speed to move the containers thereon at a constant speed, a shaft adjacent the path of travel of said containers on said table, an arm having a freely rotatable wiping roller thereon, said shaft being so positioned with respect to the container that the roller carried thereon, as the container moves around, will come in contact with the container at a point on one side and on a continued movement, of the container will come in contact with the container on the rear thereof, and means for rotating said arm at a variable speed at different points of its rotation, said driving means causing the arm to rotate relatively slower as the roller comes in contact with the front of the container and relatively faster as the roller comes in contact with the rear of the container.

16. In a labeling machine, in combination, a rotary table having a plurality of container supports mounted thereon in spaced relation, said table being driven at a constant speed with the container supported thereon moving in a fixed path of travel, a shaft adjacent the path of travel of the container, an arm mounted on and rotatable with said shaft and a freely rotatable roller mounted on said arm and movable by the rotation of said arm during the movement of the container in its fixed path of travel, first into engagement with the front of the container and finally into engagement with the rear of the container, a drive for said shaft including a gear mounted on said shaft, a rack engaging said gear, a shaft carrying said rack and rotatable in an orbit about said first-mentioned shaft for imparting through said rack and gear drive a rotation to the second-mentioned gear, and means for rotating said second-mentioned shaft, first in the direction of its orbital movement to thereby slow down the rotative movement imparted to said first-mentioned shaft, and then in the opposite direction to its orbital movement to increase the speed of said first-mentioned shaft.

17. In a labeling machine, in combination, a rotating table having a plurality of container supports thereon and traveling in a fixed path of travel to move the containers supported therein to a fixed path of travel, a rotatable shaft adjacent the path of travel of said containers, a radial arm mounted on said shaft and a freely rotatable wiping roller mounted on said arm, and means for driving said shaft comprising a gear fixed to said shaft, and a rack engaging said gear mounted on a shaft moving in an orbit about said first-mentioned shaft to impart a rotative movement to said first-mentioned shaft, a lever arm carried by said second-mentioned shaft and a stationary cam engaged by said lever arm, the face of said cam being so disposed as to rock said second-mentioned shaft in the direction of orbital travel thereof whereby the speed of drive of said first-mentioned shaft is relatively slow and to rock said lever in a direction opposite to the orbital travel of said second-mentioned shaft whereby the speed of rotation of said first-mentioned shaft is caused to be relatively fast.

18. In a labeling machine, in combination, a rotary table, a plurality of container holders arranged about the periphery of said table in spaced relationship, a label-holding finger for each container comprising an upwardly extending arm, a finger member pivotally mounted on said arm comprising upper and lower portions disposed at an angle relatively to one another, each of said portions being provided with a resilient pad and an intermediate label engaging pad slidably mounted at the angle between said upper and lower portions of said pivotally mounted finger and biased in engaging position relatively to said finger.

19. In a labeling machine, in combination, a rotary table, a plurality of container holders arranged about the periphery of said table in spaced relationship, each holder including a clamping arm for engagement with the top of the holder, said arm having a cone-shaped receiving recess shouldered on its inner face and adapted to engage over the top of the container, label-holding fingers adapted to engage the sides of the containers, and means for biasing said fingers into engaging position.

20. In a labeling machine, in combination, a rotary table, a plurality of bottle clamps mounted about the circumference of said table in spaced relationship, a label holding finger for each clamp, a bell crank arm for each finger pivoted on the table to swing on an axis vertical to the table and adapted to support a finger, a plurality of cam members stationarily mounted about the axis of the table cooperating with said bell crank arms for moving the fingers into disengaged position at substantially the same point in the path of rotation of said table and releasing said fingers to move into engaging position at different points in the path of movement of said table, and flexible means for biasing said fingers into engaged position.

21. In a labeling machine, in combination, a rotary table, a plurality of container clamps mounted about the circumference of said table in spaced relationship, a label applying mechanism disposed beyond the circumference of said table and including a relatively stationary label supporting magazine and an oscillating picker arm movable to and from said magazine to move the picker arms in contact with the labels in said magazine and reciprocating radially with respect to said table to move said picker arm into and out of the path of the container holders, and means for oscillating said picker arm including a reciprocating rod having a pivoted break joint intermediate of its ends, an engaging member carried by the lower half of said rod and a stop movable into position to be engaged by said member for breaking said joint under predetermined conditions.

22. In a labeling machine, in combination, a rotary table, a plurality of container holders disposed about the table in spaced relation and constructed to hold the containers in fixed position, a label-applying device disposed beyond the periphery of said table including a magazine for supporting a stack of labels and an oscillating picker arranged to swing to and from said magazine and comprising a radially reciprocating support, a pair of spaced apart downwardly extending arms, a pivot pin for securing each of said arms to said support to permit the same to swing laterally, each of said arms having a tongue and groove connection with said support, a coil spring surrounding said pivot pin and maintaining said tongue and groove connection for normally maintaining said arms in their spaced relation and permitting the same under stress to separate, and label-supporting leaves hinged on said arms.

23. In a labeling machine, in combination, a rotary table, a plurality of container holders arranged about the periphery of said table in spaced relation, a label-holding finger for each container, a bell crank arm pivoted on the table for each finger and adapted to support a finger, a cam support coaxial with said table having a plurality of stepped cam-supporting shoulders, a cam bolted to each of said shoulders and adapted to cooperate with the bell crank arms of certain ones of said fingers, and means for adjustably maintaining each of said cams rotatably stationary on the shoulder.

24. In a labeling machine, the combination with a rotary table, of a plurality of container supporting members on said table arranged in spaced relation and adapted to move the containers held thereby in a fixed rotary path, a drive for said table including an air operated clutch, a valve for controlling the operation of said operated clutch means for operating said valve to cause said clutch to disengage, means for holding said valve operating means inoperative, said second-mentioned means including a trip arm adjacent the path of travel of said container supporting members and beyond the normal path of travel of the container supported in said members and in a position to be engaged by a container on said table when said container is beyond its normal path of travel.

JAMES KANTOR.
EDWARD ROSENBERG.